United States Patent [19]

Himuro

[11] Patent Number: 5,609,699
[45] Date of Patent: Mar. 11, 1997

[54] PNEUMATIC RADIAL TIRES INCLUDING A FORK-SHAPED GROOVE

[75] Inventor: Yasuo Himuro, Tachikawa, Japan

[73] Assignee: Bridgestone Corporation, Tokyo, Japan

[21] Appl. No.: 528,557

[22] Filed: Sep. 15, 1995

[30] Foreign Application Priority Data

Sep. 20, 1994 [JP] Japan .................................. 6-244919

[51] Int. Cl.$^6$ ................................................ B60C 115/00
[52] U.S. Cl. ................................ 152/209 R; 152/209 D
[58] Field of Search .......................... 152/209 R, 209 D; D12/149, 151

[56] References Cited

U.S. PATENT DOCUMENTS

| | | | |
|---|---|---|---|
| 4,609,022 | 9/1986 | Fetty et al. | 152/209 R |
| 4,700,762 | 10/1987 | Landers | 152/209 |
| 5,131,443 | 7/1992 | Kuhr et al. | 152/209 R |
| 5,421,391 | 6/1995 | Himuro | 152/209 R |
| 5,423,364 | 6/1995 | Himuro | 152/209 R |
| 5,549,147 | 8/1996 | Kuhr et al. | 152/209 R |

FOREIGN PATENT DOCUMENTS

| | | |
|---|---|---|
| 0503404A1 | 9/1992 | European Pat. Off. . |
| 90 02 986.0 | 5/1991 | Germany . |
| 319025 | 12/1993 | Japan .................................. 152/209 D |
| 2224472 | 5/1990 | United Kingdom ............... 152/209 D |
| 2239845 | 7/1991 | United Kingdom ............... 152/209 D |

*Primary Examiner*—Steven D. Maki
*Attorney, Agent, or Firm*—Sughrue, Mion, Zinn, Macpeak & Seas

[57] ABSTRACT

A pneumatic radial tire possesses excellent drainage property on wet road without damaging steering stability and the like and has a tread pattern of a tread portion defined by a plurality of main slant grooves each extending from a pattern center toward a tread end in a gradually expanding direction and comprised of a steeply slant segment and a gently slant segment extending in a region near to a side end of the tread portion without crossing any other grooves. Further, a fork-shaped groove is bifurcated from the steeply slant segment at a position ranging from the pattern center within ¼ of a width of the tread portion and provided with at least two branch groove segments each extending without crossing any other grooves. Each of land portions defined between the main slant groove and the fork-shaped groove and between the branch groove segments of the fork-shaped groove and tapered toward the pattern center has an included angle of 5–40° and a surface height of a tapered zone of each of the land portions is gradually decreased toward a top side thereof.

8 Claims, 3 Drawing Sheets

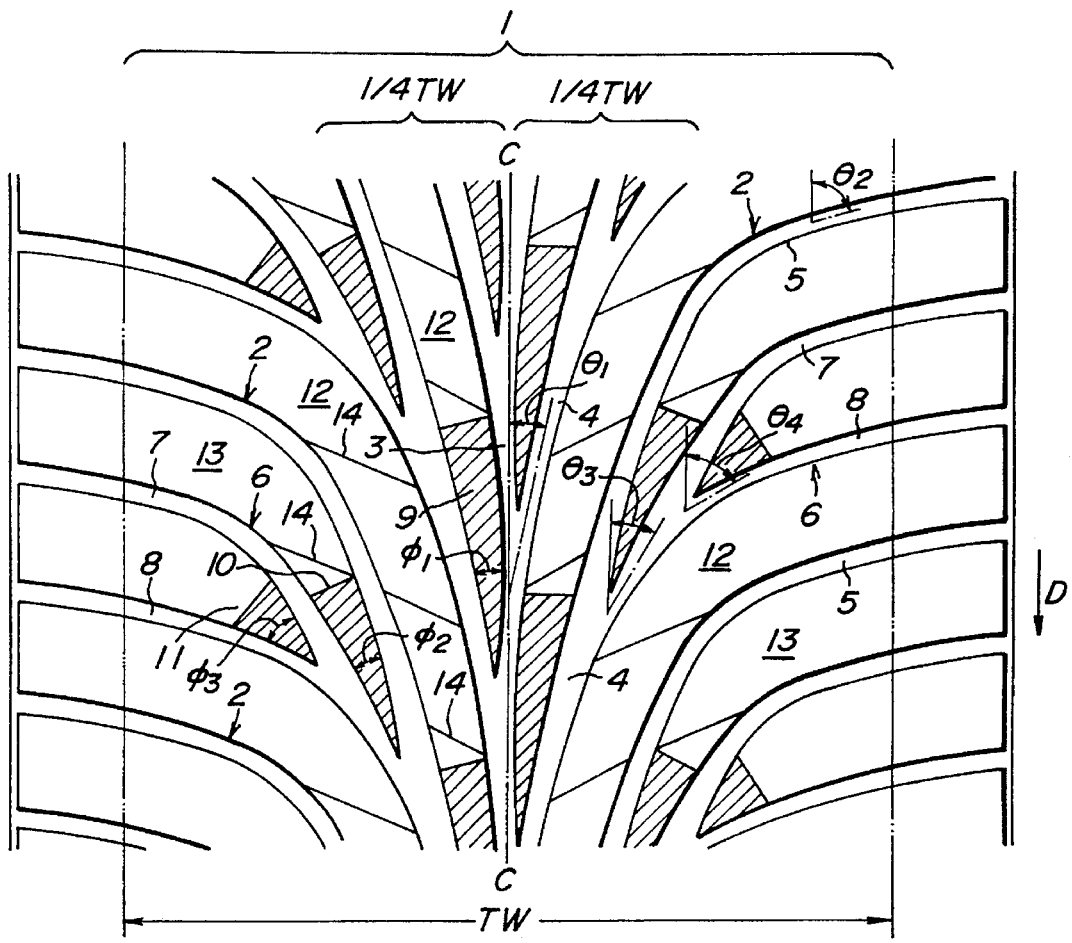
FIG_1
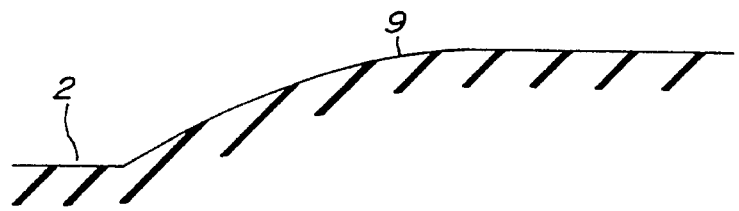
FIG_2

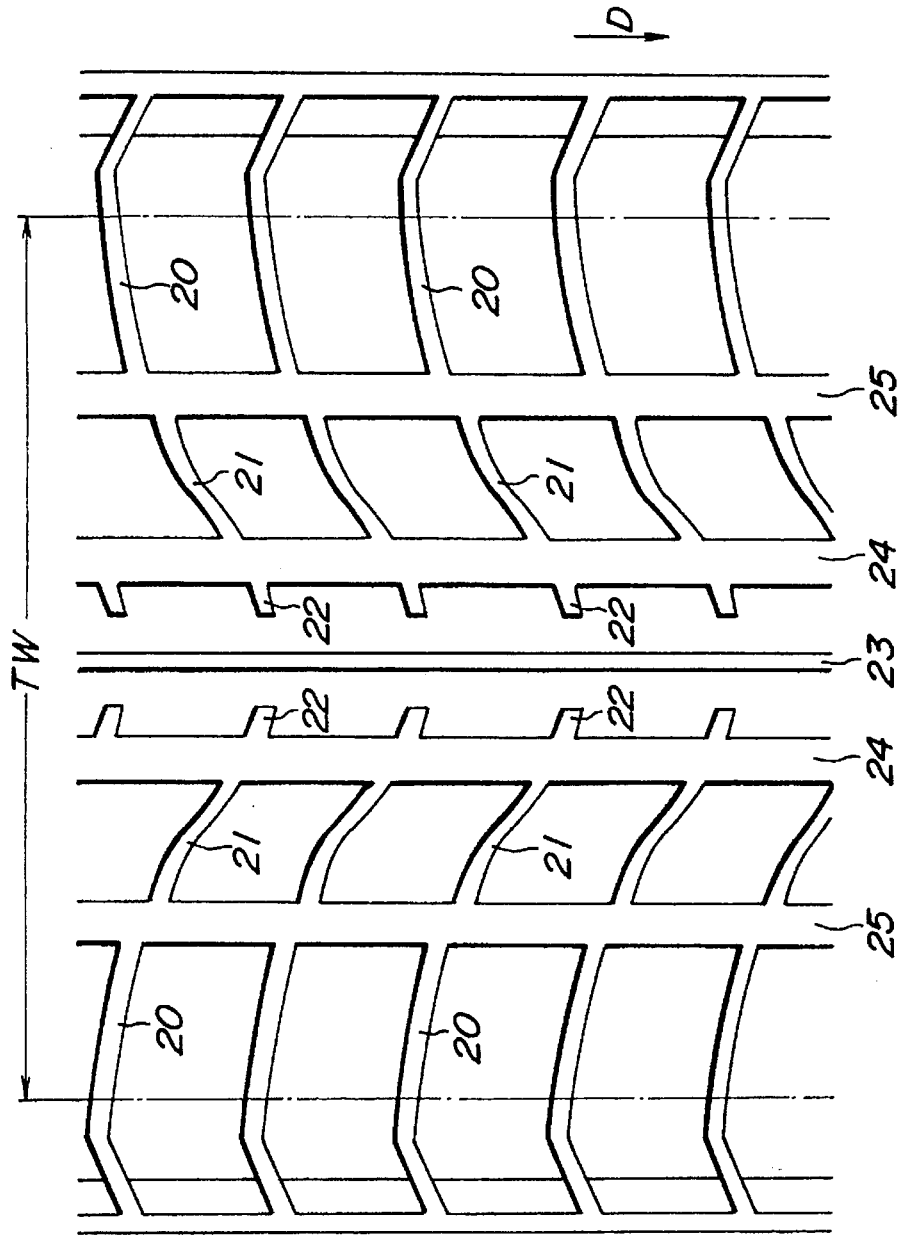

PNEUMATIC RADIAL TIRES INCLUDING A FORK-SHAPED GROOVE

BACKGROUND OF THE INVENTION

1. Field of the Invention

This invention relates to pneumatic radial tires, and more particularly to so-called high-performance pneumatic radial tire having excellent running performances which provides an excellent steering stability on dry road surface and controls noise to a sufficiently low level and effectively improves a drainage property on wet road surface.

2. Description of the Related Art

In the conventional high-performance tire, it is general to adopt so-called directional tread pattern comprising a combination of straight circumferential groove(s) extending in the Circumferential direction of the tire and slant grooves extending substantially in a V-shaped form viewed from a front of the tire. The maintenance of more excellent drainage property in such a tire is frequently attained by enhancing a negative ratio.

On the other hand, it has been confirmed that the drainage property may be improved by using a combination of slant grooves extending substantially in a V-shaped form viewed from the front of the tire and steeply slant grooves extending in the same direction of the above slant grooves and having particularly a small inclination angle with respect to a pattern center, and arranging gently slant grooves in a side region of the tread for the drainage toward the side of the tire.

In the above conventional techniques, the straight circumferential groove and the slant groove or the slant groove and the steeply slant groove are crossed with each other in the formation of the tread pattern, so that when water existing on a road surface is drained through each groove during the running of the tire under a load, disorder of water flow resulted from the joining at a joint position and disorder of water flow resulted from the large change of water flow at a divergent position are created, respectively, which undesirably bring about the lowering of the drainage efficiency.

SUMMARY OF THE INVENTION

The invention is based on investigation results for solving the aforementioned problems of the conventional technique and is to provide a pneumatic radial tire having considerably improved drainage property on wet road surface without sacrificing the other performances of the tire.

According to the invention, there is the provision of a pneumatic radial tire having a tread pattern of a tread portion defined by arranging in a ground contact area of the tread portion a plurality of main slant grooves bordering on a center of the pattern and extending in a gradually expanding direction from bottom toward top viewed from a front of the tire at a state of mounting on a vehicle and opening to an end of the tread portion; each of said main slant groove being comprised of a steeply slant segment extending in a region near to the side of the pattern center and having an inclination angle of 0°–30° with respect to a circumferential direction of the tire and a gently slant segment smoothly connecting to the steeply slant segment and extending in a region near to a side end of the tread portion without crossing any other grooves and having an inclination angle of 60°–90° with respect to the circumferential direction, in which a fork-shaped groove is bifurcated from the steeply slant segment of each of the main slant grooves at a position ranging from the pattern center within ¼ of a width of the tread portion and extended toward each end of the tread portion and provided with at least two branch groove segments each extending in a region near to the end of the tread portion and opening to the end of the tread portion without crossing any other grooves, and each of land portions defined between the main slant groove and the fork-shaped groove and between the branch groove segments of the fork-shaped groove and tapered toward the pattern center has an included angle of 5°–40° and a surface height of a tapered zone of each of the land portions is gradually decreased toward a top side thereof (an end of the tapered zone).

In a preferred embodiment of the invention, the decreasing region of the surface height in the tapered zone is generally within a range of 10–30 mm in a lengthwise direction of the tapered zone in connection with the magnitude of the included angle in the land portion, while the decreasing form of the surface height may be a decrease as a flat plane, a curved decrease as an outward convex shape in the radial direction of the tire or the like.

When the main slant grooves located apart from the pattern center are extended up to the pattern center to form a circumferential groove continuously extending in the circumferential direction of the tire, each of land portions defined between the mutual main slant grooves, between the main slant groove and the fork-shaped groove and between the branch groove segments of the fork-shaped groove and tapered toward the pattern center has an included angle of 5°–40°, and the surface height of tapered zone in each of these land portions is gradually decreased toward the top side thereof.

In the latter case, it is preferable that the included angles of these land portions are made small as the top of the tapered zone approaches to the pattern center. That is, it is favorable that the included angle of the land portion defined between the mutual main slant grooves is within a range of 10°–20°, the included angle of the land portion defined between the main slant groove and the fork-shaped groove is within a range of 15°–25°, and the included angle of the land portion defined between the branch groove segments of the fork-shaped groove is within a range of 30°–40°.

On the other hand, when the main slant groove does not arrive at the pattern center, it is favorable to form an annular land portion continuously extending in the circumferential direction of the tire inclusive of the pattern center. In this case, the width of an end portion of each of the main slant grooves near to the pattern center is gradually narrowed near to the pattern center.

In the other preferred embodiment of the invention, the land portion defined between the main slant groove and the groove segment of another main slant groove adjacent thereto is substantially continuously extended from the side of the pattern center toward the end of the tread portion. In this case, sipes may be formed in this land portion.

BRIEF DESCRIPTION OF THE DRAWINGS

The invention will be described with reference to the accompanying drawings, wherein:

FIG. 1 is a schematic view illustrating a first embodiment of a tread pattern in the pneumatic radial tire according to the invention;

FIG. 2 is a diagrammatical view illustrating a decreasing form of surface height in a tapered zone of a land portion;

FIG. 4 is a schematic view illustrating a tread pattern in the conventional pneumatic radial tire.

DESCRIPTION OF THE PREFERRED EMBODIMENTS

Figure 3:
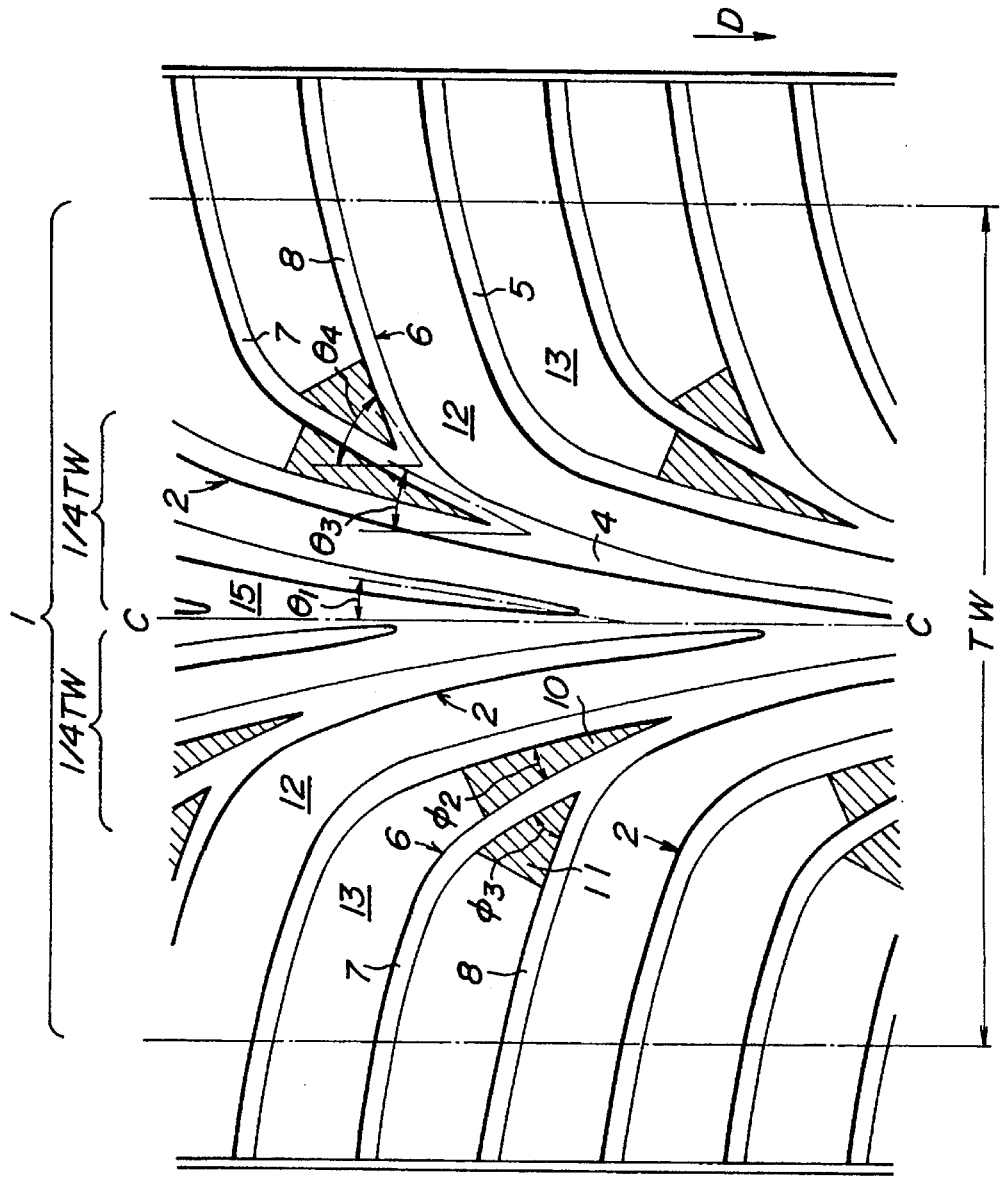
FIG. 3 is a schematic view illustrating a second embodiment of a tread pattern in the pneumatic radial tire according to the invention.

In the pneumatic radial tire according to the invention, the steeply slant segment constituting the main slant groove is extended at an inclination angle of 0°–30° with respect to the circumferential direction of the tire and the gently slant segment is extended at an inclination angle of 60°–90°, whereby the excellent drainage property of the main slant groove on wet road surface can be ensured.

This is based on the fact that when water flow is observed in the ground contact area of the tire, water is discharged forward within 30° from the circumferential direction of the tire in the pattern center region, while water tends to be discharged somewhat forward from the flank in the side region of the tread portion.

Further, the inclination angle of the gently slant segment is made to a range of 60°–90°, whereby the lateral rigidity of the land portion defined by the gently slant segment can be enhanced to provide an excellent steering stability.

The total flowing amount of water discharged through the main slant groove gradually increases toward the downstream side considering the amount of water flowed in the main slant groove on the way of discharge. If the width of the main slant groove is gradually enlarged toward the downstream side, the groove width near to the end of the ground contact area becomes extremely wide (2 times of usual case) to increase the occurrence of noise and also the width of block portion is made narrow to undesirably degrade the steering stability. According to the invention, therefore, the fork-shaped groove is bifurcated from the main slant groove, whereby the smooth discharge of a great amount of water is ensured through not only the main slant groove but also the branch groove segments of the fork-shaped groove. Such a discharge becomes particularly remarkable when the branch groove segment after the bifurcation is extended without crossing any other grooves to avoid energy loss due to the joining of water flow.

According to the invention, at least two branch groove segments are formed in the fork-shaped groove for ensuring the sufficient drainage capacity. If the groove segments are extended without bifurcation, the drainage capacity is undeniable to be lacking.

Furthermore, the fork-shaped groove is bifurcated from the steeply slant segment of the main slant groove at a position ranging from the pattern center within ¼ of the tread width, whereby the relatively steep inclination is ensured in the groove segment after the bifurcation and hence the efficient drainage is possible. In other words, when the fork-shaped groove is bifurcated at a position exceeding ¼ of the tread width, the inclination angle of the branch groove segment with respect to the circumferential direction of the tire becomes large to lower the drainage efficiency.

In the tire according to the invention, when the included angle of the land portion or a bifurcating angle of each groove is within a range of 5°–40°, the sudden change of flow direction in the bifurcation running of water discharged can be prevented to effectively reduce energy loss due to the flowing disorder. When the included angle is less than 5°, the rigidity of the land portion is too low and it is difficult to steadily bifurcate water flow, while when it exceeds 40°, the flow direction at the bifurcated portion is suddenly changed to cause the same flow disorder as described in the conventional technique and hence the drainage efficiency is lowered.

Furthermore, the surface height of the tapered zone of the land portion is gradually decreased toward the top side thereof for more smoothening the bifurcation running of water discharged, whereby the crushing of the tapered zone in the contacting with ground and hence the escape deformation of the tapered zone into the groove is sufficiently prevented.

Moreover, the decrease of surface height in the tapered zone contributes to ensure not only the rigidity of the land portion but also the surface pressure in the ground contact area, which acts to develop the excellent steering stability.

In the tire according to the invention, when each of the main slant grooves located apart from the pattern center is extended on the pattern center to form the circumferential groove substantially continuously extending in the circumferential direction of the tire, the drainage property can be more improved.

In this case, the included angle of each of the land portions defined between the mutual main slant grooves, between the main slant groove and the fork-shaped groove and between the branch groove segments of the fork-shaped groove is within a range of 5°–40°, and the surface height of the tapered zone in these land portions is gradually decreased toward the top side thereof, whereby the flow of water discharged can sufficiently and steadily be smoothened to effectively improve the drainage efficiency and also the high steering stability can be ensured.

In these tires as mentioned above, when the included angle of the land portion is made small as the end of the tapered zone approaches to the pattern center, the discharge direction of water is sufficiently closed to the flowing direction based on the above observation result, whereby the flow of water discharged can be more smoothened.

When the included angle of the land portion defined between the mutual main slant grooves is 10°–20°, the included angle of the land portion defined between the main slant groove and the fork-shaped groove is 15°–25° and the included angle of the land portion defined between the branch groove segments of the fork-shaped groove is 30°–40° since the included angle of the land portion in the central portion of the tread firstly contacting with water film on a wet road surface is set to 10°–20°, the resistance suffered from the water film is controlled to a low level and the hydroplaning hardly occurs. On the other hand, the included angle of the land portion in the side end region of the tread portion is set to 30°–40° to enhance the lateral rigidity of this land portion, so that the steering stability in the cornering can be ensured. Moreover, the included angle of the land portion in the middle region of the tread portion is set to 15°–20°, whereby the lateral rigidity of this land portion and the drainage property are harmonized.

In case of forming the annular land portion continuously extending in the circumferential direction of the tire inclusive of the pattern center, it is possible to reduce the pattern noise.

When the land portion defined between the main slant groove and the groove segment of the other main slant groove adjacent thereto is substantially continuously extended from the side of the pattern center toward the end of the tread portion, the pattern noise is reduced by smooth ground contact, and the block rigidity is high and the steering stability is excellent. Furthermore, the groove segment is not joined with the other groove, so that the flow loss is less as previously mentioned.

When the width of the end portion of each of the main slant grooves near to the pattern center is gradually narrowed toward the pattern center, the width of the land portion in the region of the pattern center can sufficiently be ensured to ensure the block rigidity.

FIG. 1 is a developed view illustrating a first embodiment of the tread pattern in the pneumatic radial tire according to the invention.

Moreover, the internal reinforcing structure of the tire is the same as the usual radial tire and is omitted here.

In FIG. 1, symbol C is a center of the tread pattern. The pattern center C is coincident with the center of the tread portion in the illustrated embodiment, but may be offset somewhat from the tread center in a given direction.

In the illustrated embodiment, a plurality of main slant grooves 2 are arranged in a ground contact area 1 of the tread portion bordering on the pattern center C and extended in a gradually expanding direction from bottom toward top viewed from a front of the tire at a state of mounting on a vehicle so as to open to an end of the tread portion. These main slant grooves 2 are located in each half portion separated by the pattern center C so as to offset by a half pitch in the circumferential direction of the tire. In FIG. 1, symbol D is a rotating direction of the tire.

In this case, each inner end region of the main slant grooves in each half portion is extended on the pattern center C in the circumferential direction of the tire to form a circumferential groove 3 substantially continuously extending in the circumferential direction of the tire.

Each of the main slant grooves 2 is comprised of a steeply slant segment 4 extending in a region near to the side of the pattern center and having an inclination angle $\theta_1$ of 0°–30°, preferably 5°–25° with respect to a circumferential direction of the tire and a gently slant segment 5 smoothly connecting to the steeply slant segment 4 through a bending zone and extending in a region near to a side end of the tread portion without crossing any other grooves and having an inclination angle $\theta_2$ of 60°–90°, preferably 65°–85° with respect to the circumferential direction of the tire.

A fork-shaped groove 6 is bifurcated from the steeply slant segment 4 of each of the main slant grooves 2 at a position ranging from the pattern center C within ¼ of a width TW of the tread portion and extended toward each end of the tread portion and provided with at least two branch groove segments (two branch groove segments 7, 8 in the illustrated embodiment) each extending in a region near to the end of the tread portion substantially in parallel with the gently slant segment 5 so as to open to the end of the tread portion without crossing any other grooves, An angle $\theta_3$ of a bifurcated base in the fork-shaped groove 6 with respect to the circumferential direction of the tire is preferably not more than 30°, while an angle $\theta_4$ of a branched base in the branch groove segment 8 located at lower side among the branch groove segments is preferably 65°–85° with respect to the circumferential direction of the tire. When the angle $\theta_4$ exceeds 85°, the change of groove width at the branched point is large and there is a fear of increasing the flow loss, while when the angle $\theta_4$ is less than 65°, it is a fear that the sufficient rigidity of the land portion defined by these groove segments is not obtained.

In this tire, included angles $\phi_1$, $\phi_2$, $\phi_3$ of land portions 9, 10, 11 defined between the mutual main slant grooves 1, between the main slant groove 1 and the fork-shaped groove 6 and between the mutual branch groove segments 7, 8 of the fork-shaped groove 6 and tapered toward the pattern center are within a range of 5°–40°, respectively. Preferably, the included angles $\phi_1$, $\phi_2$, $\phi_3$ are made small as the top of the tapered zone approaches to the pattern center C. More particularly, the included angle $\phi_1$ is within a range of 10°–20°, and the included angle $\phi_2$ is within a range of 15°–25°, and the included angle $\phi_3$ is within a range of 30°–40°.

Furthermore, a surface height of a tapered zone of each of the land portions 9, 10, 11 is gradually decreased toward a top side thereof (an end of the tapered zone) within a range of 10–30 mm in the lengthwise direction of the tapered zone, or in a shadowed region shown in FIG. 1. The decrease of the surface height can be attained by decreasing the tapered zone in convex curved form outward in the radial direction of the tire as shown at a section of the tapered zone in the lengthwise direction in FIG. 2.

In addition, a land portion 12 inclusive of the land portion 9 defined between the main slant groove 2 and the groove segment of the other main slant groove adjacent thereto is substantially continuously extended from the side of the pattern center toward the end of the tread portion. As shown in FIG. 1, sipes 14 are formed in each of the land portions 12 and land portions 13 inclusive of the land portion 10 for improving the ground contact property of the tire and the edge effect. These sipes 14 do not obstruct the continuity of the land portion 12.

The tire having the above structure provides the excellent steering stability on dry road surface and effectively controls the occurrence of noise and can largely improve the drainage property on wet road surface as previously mentioned.

FIG. 3 is a second embodiment of the tread pattern in the pneumatic radial tire according to the invention. In this embodiment, each end of the main slant grooves 2 near to the pattern center is located on each side of the pattern center C, whereby an annular land portion 15 continuously extending in the circumferential direction inclusive of the pattern center C is formed in the central portion of the tread pattern. And also, the width in the end portion of the main slant groove 2 near to the pattern center is gradually narrowed toward the pattern center C. The other points are the same as in the first embodiment.

In the second embodiment, the tapered zone is not defined in the land portion between the mutual main slant grooves 2, so that the treatment for decreasing the surface height is applied only to the two land portions 10, 11.

The tire of the second embodiment possesses the essential features of the invention, so that the same function and effect as in the first embodiment can be obtained.

A comparative test between an invention tire and a conventional tire is made with respect to drainage property on wet road surface, steering stability on dry road surface and pattern noise.

⊙ Test tire

The test tire is a pneumatic radial tire for passenger cars having a tire size of 225/50R16 and a tread width of 200 mm.

Invention tire 1

This is a tire having a tread pattern shown in FIG. 1 and various dimensions shown in Table 1.

TABLE 1

|  | Groove width (mm) | Inclination angle (°) | Included angle (°) |
| --- | --- | --- | --- |
| Main slant groove 2 | 5–8 | $\theta_1 = 13$ | $\phi_1 = 15$ |
| Bifurcated base of fork-shaped groove | 5–7 | $\theta_3 = 30$ | $\phi_2 = 20$ |
| Branched base | 4 | $\theta_4 = 65$ | $\phi_3 = 35$ |
| Gently slant segment 5, 7, 8 | 5 | $\theta_2 = 75$ | |
| Sipe 14 | 0.7 | 60–70 | |

Invention tire 2

This is a tire having a tread pattern shown in FIG. 3 and various dimensions shown in Table 2.

TABLE 2

|  | Groove width (mm) | Inclination angle (°) | Included angle (°) |
| --- | --- | --- | --- |
| Main slant groove 2 | 2–5–6 | $\theta_1 = 9$ | |
| Bifurcated base of fork-shaped groove | 5–6 | $\theta_3 = 25$ | $\phi_2 = 13$ |
| Branched base | 5 | $\theta_4 = 55$ | $\phi_3 = 40$ |
| Gently slant segment 5, 7, 8 | 5 | $\theta_2 = 75$ | |

Conventional tire

This is a tire having a tread pattern shown in FIG. 4.

This tire shows a typical example of the tread pattern in the conventional pneumatic radial tire in which five circumferential straight grooves and a plurality of directional slant grooves are arranged at given intervals in the tread portion. The tire has a tire size of 225/50R16 and a tread width TW of about 200 mm, which are substantially the same as mentioned above.

In the conventional tire, a circumferential groove 23 arranged in a center of the tread portion has a narrow width of 4 mm, while a pair of circumferential grooves 24 having a groove width of 11 mm are arranged on both sides of the groove 23 and a pair of circumferential grooves 25 having a groove width of 25 are arranged at a position corresponding to about ¼ of the tread width from each end of the tread portion toward the tread center. The four large-size circumferential grooves contribute to the drainage property on wet road surface together with many directional slant grooves 20, 21, 22.

◎ Test method

The test tire inflated under an inner pressure of 2.3 kgf/cm² is mounted onto a vehicle and actually run under a load corresponding to one riding member, during which each property is evaluated as follows.

The drainage property on wet road surface is evaluated by measuring a speed of causing hydroplaning phenomenon in the straight running on wet road surface having a water depth of 10 mm, or by measuring limit lateral G and a speed of causing hydroplaning phenomenon in the cornering at a radius of 80 m on wet road surface having a water depth of 10 mm.

The steering stability on dry road surface is evaluated by feeling of a test driver in the running on a circuit course of dry state at various running modes.

The pattern noise is evaluated by measuring indoor noise when the vehicle is inertially run from a speed of 100 km/h on a straight smooth road.

◎ Test results

The results of the above tests are shown in Table 3 in which each property is represented by an index value on the basis that the conventional tire is 100 as a control. The larger the index value, the better the result.

TABLE 3

|  | Conventional tire | Invention tire 1 | Invention tire 2 |
| --- | --- | --- | --- |
| Drainage property (straight running) | 100 | 120 | 115 |
| Drainage property (cornering) | 100 | 125 | 120 |
| Steering stability on dry road surface | 100 | 100 | 100 |
| Pattern noise | 100 | 103 | 105 |

As seen from the above results, according to the invention, the excellent steering stability on dry road surface is ensured, while the pattern noise is controlled to a sufficiently low level and the drainage property on wet road surface can largely be improved.

What is claimed is:

1. A pneumatic radial tire having a tread portion and a tread pattern in the tread portion, the tread pattern including in a ground contact area of the tread portion a plurality of main slant grooves, the main slant grooves bordering on a center of the pattern and extending in a gradually expanding direction from bottom toward top viewed from a front of the tire at a state of mounting of the tire on a vehicle and opening to an end of the tread portion; each of said main slant grooves being comprised of a steeply slant segment being located in a region near the pattern center and having an inclination angle of 0°–30° with respect to a circumferential direction of the tire and a gently slant segment smoothly connected to the steeply slant segment and being located in a region near a side end of the tread portion without crossing any other grooves and having an inclination angle of 60°–90° with respect to the circumferential direction, wherein a fork-shaped groove is bifurcated from the steeply slant segment of each of the main slant grooves at a position between the pattern center and a position which is located a distance of ¼ of a width of the tread portion from the pattern center and extended toward each end of the tread portion and provided with at least two branch groove segments, each of the two branch segments opening to the end of the tread portion without crossing any other grooves, a land portion being defined for each of the main slant grooves between the main slant groove and the fork-shaped groove and having an included angle of 5° to 40° and a land portion being defined for each fork-shape groove between the branch groove segments of the fork-shaped groove and having an included angle of 5°–40°, each of the land portions including a tapered zone having an end and a surface height of the tapered zone of each of the land portions is gradually decreased toward the end of the tapered zone.

2. A pneumatic radial tire according to claim 1, wherein the main slant grooves are located apart from the pattern center and are extended up to the pattern center to form a circumferential groove continuously extending in the circumferential direction of the tire, each of land portions defined between adjacent main slant grooves having an included angle of 5°–40° and including a tapered zone having an end, and the surface height of the tapered zone of each of the land portions which are defined between adjacent main slant grooves is gradually decreased toward the end of the zone.

3. A pneumatic radial tire according to claim 2, wherein the included angle of the land portion between adjacent slant grooves is smaller than the included angle of the land portion between the main groove and the fork-shaped groove, and the included angle of the land portion between the main slant groove and the fork-shaped groove is smaller than the included angle of the land portion between the branch segments of the fork-shaped groove.

4. A pneumatic radial tire according to claim 1 wherein an included angle of the land portion between adjacent slant grooves is smaller than the included angle of the land portion between the main groove and the fork-shaped groove, and the included angle of the land portion between the main slant groove and the fork-shaped groove is smaller than the included angle of the land portion between the branch segments of the fork-shaped groove.

5. A pneumatic radial tire according to claim 4, wherein the included angle of the land portion defined between the adjacent main slant grooves is within a range of 10°–20°, the included angle of the land portion defined between the main slant groove and the fork-shaped groove is within a range of 15°–25°, and the included angle of the land portion defined between the branch groove segments of the fork-shaped groove is within a range of 30°–40°.

6. A pneumatic radial tire according to claim 1, wherein each of the main slant grooves has an end located on a side of the pattern center and an annular land portion continuously extending in the circumferential direction of the tire is formed at the pattern center.

7. A pneumatic radial tire according to claim 1, wherein a land portion defined between the main slant groove and a segment of another main slant groove adjacent thereto is substantially continuously extended from the pattern center toward the end of the tread portion.

8. A pneumatic radial tire according to claim 7, wherein a width of an end portion of each of the main slant grooves gradually narrows toward the pattern center.

* * * * *

UNITED STATES PATENT AND TRADEMARK OFFICE
CERTIFICATE OF CORRECTION

PATENT NO. : 5,609,699
DATED : March 11, 1997
INVENTOR(S) : Yasuo Himuro

It is certified that error(s) appears in the above-identified patent and that said Letters Patent is hereby corrected as shown below:

Title page, item [30],
In the Foreign Application Priority Data, delete "6-244919" and insert --6-224919--.

Signed and Sealed this

Twenty-third Day of September, 1997

Attest:

BRUCE LEHMAN

*Attesting Officer*     *Commissioner of Patents and Trademarks*